M. VAUGHN.
Making Tires.
No. 8,395.
Patented Sept. 30, 1851.
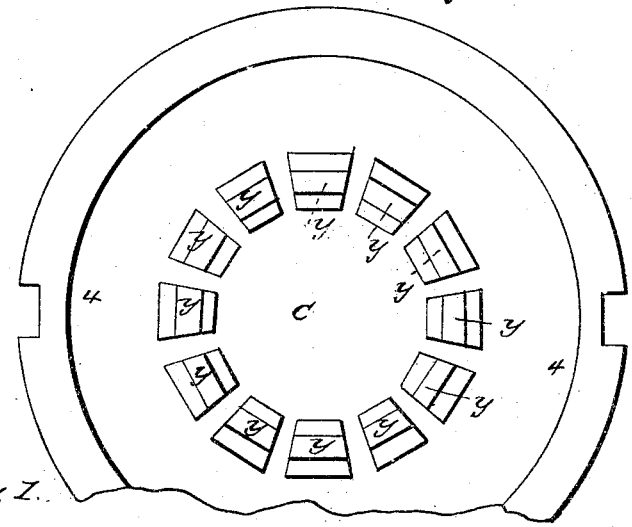
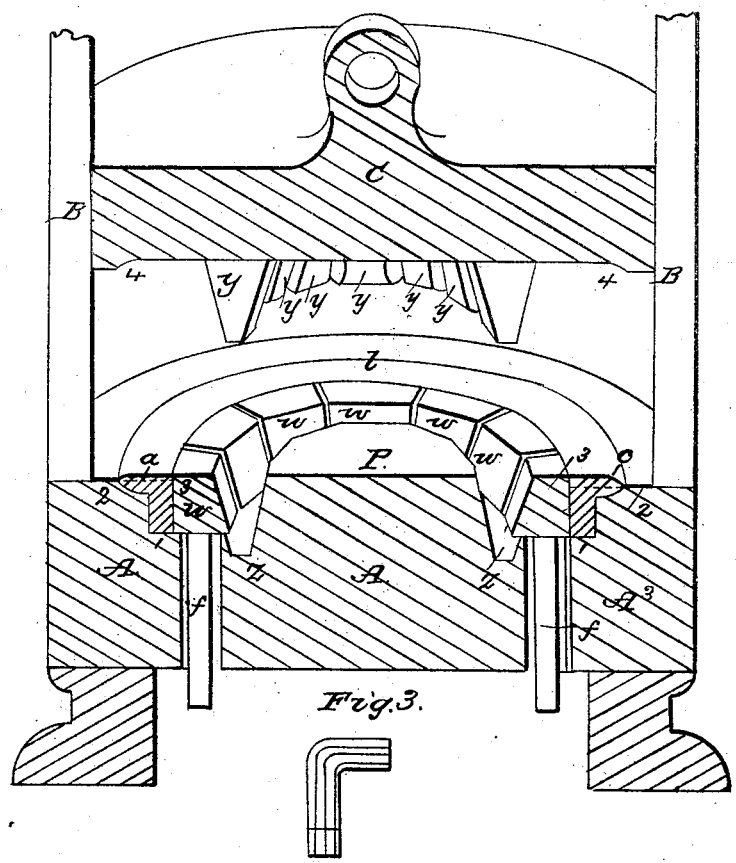

UNITED STATES PATENT OFFICE.

MARIA VAUGHN, ADMINISTRATRIX OF JOSEPH C. VAUGHN, DECEASED, OF GREENBUSH, NEW YORK, ASSIGNOR TO JAMES C. BELL AND ROBERT CHRYSTIE, JR.

MACHINE FOR MAKING WHEEL-TIRES.

Specification of Letters Patent No. 8,395, dated September 30, 1851.

*To all whom it may concern:*

Be it known that JOSEPH C. VAUGHN, of the town of Greenbush, Rensselaer county, State of New York, now deceased, in his lifetime invented a new and useful Apparatus for Making Wrought-Iron Tires for Railroad-Car Wheels; and I declare the following specification with the drawings appended thereto and forming part thereof to be a full and complete description of the same.

Figure 1 A A represents a perspective view of a strong cylindrical metal box or mold, with the hither half removed showing a vertical section of the mold at its center, with a half-tire completed lying in the mold and marked *a, b, c*. The upper and outer edge or angle of the cavity of this box is formed into a matrix or die to shape a portion of the tire, (being the outer surface of the tire in reference to the position of the wheel on its axis when standing up), from its outer vertical face 1 to a plane of section parallel thereto 2, 3, passing through the lowest edge of the flange of the tire. The inner part of the tire from 2, 3 being the inner surface of the flange is shaped by a corresponding formation at 4 in the face of the hammer, ram or die C. This is a heavy mass of metal traversing between and guided and kept from turning by slides B B rising from the sides of the mold. The lower face of this die is hollowed out like a saucer, the space between the curves at 4 being flat as shown in the profile of its lower edge in Fig. 1.

The lower part of the tire, as it lies in the mold rests upon the bottom of the box A, which continues on the same level toward the center of its area sufficiently far to support blocks or welders W whose outer surfaces are made conformable to the intended inner surface of the tire, their inner surfaces sloping from the top inwardly for reasons hereafter mentioned. These blocks are sections of an annular disk whose thickness is equal to the intended width of the tire, and are as many in number as can be most conveniently operated. To guide them in their course each one has a narrow fin *f* projecting from it and extending through the bottom of the box through a narrow radial slot.

The center of this mold is a solid boss P projecting from the bottom, whose top is on a level with the top of the welders *w* its outside surface being divided into facets corresponding to the number of the welders, these facets having a slope from the top outwardly equal to the slope of the inner surfaces of the welders, so that the introduction of wedges forcibly between the facets and the welders will press the welders outwardly.

On the lower face of the ram there are fixed directly over the spaces between the facets and welders wedges *y, y*, for the purpose just described, and a groove or cavity to receive the lower ends of the wedges, when driven home is provided in the bottom of the box as at *z z*.

It is not absolutely necessary to have the boss P. The wedges may be connected together just back of their front faces, and the space from that connection to the center filled with solid material.

The process of making the tire is thus. The bars of which it is to be composed are to be laid together in any manner deemed most suitable and expedient for securing the best combination of materials into one mass; one form of which is shown in cross section at Fig. 3. These parts are to be secured together by rivets or otherwise for the convenience of handling; then to be submitted to a welding heat and when heated to be laid quickly into the mold. When in its place, the ram is to be brought down upon it, which by the wedges forcing the welders outwardly and compressing the heated metal firmly between the welders, the sides of the mold and the lower face of the ram, completes the work welding the material together, at the same time giving the requisite form. By using as the outer course of these bars a bar of steel, previously forged of proper size and form for the purpose, as shown by the portion colored blue, in Fig. 3, it is proposed simultaneously with forming the tire to face the tread and inner surface of the flange with steel.

This machine is intended as an accompaniment to a machine for making wrought iron railroad car and other wheels, invented by said JOSEPH C. VAUGHN and for which a patent application has been made and patent issued to the assignees of MARIA VAUGHN as administratrix of said JOSEPH.

What I desire to claim and secure by Letters Patent is—

The combination of the upper and lower dies, with the welders receiving motion from wedges attached to the upper and falling die, the whole acting to shape a tire on all parts of its surface at the same time substantially as described in the within specification.

MARIA VAUGHN,
*Administratrix of the estate of Joseph C. Vaughn, deceased.*

Witnesses:
C. V. WITBECK,
JOHN E. VAN ALEN.